(12) United States Patent
Willis et al.

(10) Patent No.: US 12,460,666 B2
(45) Date of Patent: Nov. 4, 2025

(54) FERRULES FOR POLE AND TOOL EXTENSION

(71) Applicant: Jameson, LLC, Clover, SC (US)

(72) Inventors: Christopher Ryan Willis, Clover, SC (US); Blake Andrew Tomlinson, Statesville, NC (US)

(73) Assignee: Jameson, LLC, Clover, SC (US)

( * ) Notice: Subject to any disclaimer, the term of this patent is extended or adjusted under 35 U.S.C. 154(b) by 289 days.

(21) Appl. No.: 18/474,830

(22) Filed: Sep. 26, 2023

(65) Prior Publication Data

US 2024/0011517 A1  Jan. 11, 2024

Related U.S. Application Data

(63) Continuation-in-part of application No. 16/488,446, filed as application No. PCT/US2019/047187 on Aug. 20, 2019, now Pat. No. 11,788,566.

(60) Provisional application No. 62/768,338, filed on Nov. 16, 2018.

(51) Int. Cl.
*F16B 7/18* (2006.01)
*B25G 1/04* (2006.01)
*B25J 18/02* (2006.01)
*A01G 3/08* (2006.01)

(52) U.S. Cl.
CPC ............... *F16B 7/182* (2013.01); *B25G 1/04* (2013.01); *B25J 18/025* (2013.01); *A01G 3/081* (2013.01); *A01G 3/083* (2013.01)

(58) Field of Classification Search
CPC ... F16B 7/182; F16B 7/18; B25G 1/04; A01G 3/081; A01G 3/083; B25J 18/025
See application file for complete search history.

(56) References Cited

U.S. PATENT DOCUMENTS

| | | | | |
|---|---|---|---|---|
| 2,834,625 A | * | 5/1958 | Stanley | B25G 1/04 403/345 |
| 3,682,516 A | * | 8/1972 | Savage | B25G 3/30 403/189 |
| 4,461,057 A | * | 7/1984 | Unger | B25G 1/04 D8/107 |
| 4,642,837 A | * | 2/1987 | Nichols | A46B 5/00 15/171 |

(Continued)

*Primary Examiner* — Daniel J Wiley
(74) *Attorney, Agent, or Firm* — Shumaker, Loop & Kendrick, LLP; S. Alexander Long, Jr.; Brian D. MacDonald

(57) ABSTRACT

A ferrule system includes: a first ferrule comprising a proximal end for engaging a first implement and a threaded portion opposite the proximal end; and a second ferrule comprising a distal portion for engaging a second implement, a proximal portion opposite the distal portion and comprising teeth, a threaded portion intermediate the distal portion and proximal portion and configured to engage the threaded portion of the first ferrule. Teeth are mounted on the first ferrule and are biased to automatically engage the teeth of the proximal portion of the second ferrule as the threaded portion of the first ferrule engages the threaded portion of the second ferrule such that only tightening rotation of the second ferrule relative to the first ferrule is permitted when the teeth mounted on the first ferrule are automatically engaged with the teeth of the proximal portion of the second ferrule.

17 Claims, 18 Drawing Sheets

(56) References Cited

U.S. PATENT DOCUMENTS

| | | | | |
|---|---|---|---|---|
| 5,226,198 | A * | 7/1993 | Martin | B05C 17/0205 |
| | | | | 15/176.3 |
| 5,924,235 | A * | 7/1999 | McCulley | A01K 87/02 |
| | | | | 43/18.5 |
| 6,293,726 | B1 * | 9/2001 | Wolf | B25G 3/30 |
| | | | | 403/299 |
| 7,198,425 | B2 * | 4/2007 | Bergkvist | B62D 1/20 |
| | | | | 403/359.5 |
| 7,607,855 | B2 * | 10/2009 | Lai | A63C 11/221 |
| | | | | 403/368 |
| 8,562,454 | B2 * | 10/2013 | Burch | A63B 60/00 |
| | | | | 473/307 |
| 8,613,739 | B2 * | 12/2013 | Sobue | A61M 39/10 |
| | | | | 403/309 |
| 8,919,387 | B2 * | 12/2014 | Martin | E21B 17/042 |
| | | | | 285/333 |
| 10,744,635 | B1 * | 8/2020 | Stratton | B25G 1/04 |
| 11,213,940 | B2 * | 1/2022 | Buckley | B25G 1/06 |
| 2003/0050132 | A1 * | 3/2003 | Wilbur | A63B 53/12 |
| | | | | 473/323 |
| 2005/0176521 | A1 * | 8/2005 | Burch | A63B 53/02 |
| | | | | 473/307 |
| 2016/0177992 | A1 * | 6/2016 | Lin | F16B 7/182 |
| | | | | 403/343 |

\* cited by examiner

FERRULES FOR POLE AND TOOL EXTENSION

CROSS-REFERENCE TO RELATED APPLICATIONS

This is a continuation-in-part (CIP) application of U.S. patent application Ser. No. 16/488,446, filed Aug. 23, 2019, which is a national stage patent application claiming the benefit of priority of International Application No. PCT/US19/47187, filed Aug. 20, 2019, which claims the priority of U.S. Provisional Application No. 62/768,338, filed Nov. 21, 2018, all of which are hereby incorporated by reference in their entireties.

TECHNICAL FIELD AND BACKGROUND OF THE INVENTION

The present invention relates to the field of extension poles and more particularly to ferrules used to connect sections of extension poles. The present invention includes a non-conductive ferrule connection interface made from a composite material and having a threaded connection.

Fiberglass extension poles, also known as layup sticks or hot sticks, are used for many applications of overhead work. Tree trimming and cable installation or maintenance are just two examples. Other examples include pole pruners, pole saws, line clearance tree trimming, and aerial construction and maintenance tools. Fiberglass construction is desirable because it is strong, lightweight, and is a very effective electrical insulator. Conventional connection fittings, or "ferrules," are constructed of aluminum or steel. The fittings typically fit together in an internal/external sleeve interface and utilize a locking pin or button to secure the connection.

Ferrules of this design are electrically conductive due to the material properties. This introduces a discontinuity of insulating properties between sections of fiberglass pole. When accessories such as saw blade mounting heads or pruning heads are installed at the upper pole end, the metal ferrule also contributes to the overall length of conductive material at the top of the pole. When using poles near live lines such as during tree-trimming line clearance, excessive lengths of metal components can contribute to increased risks of utility damage by short circuit, or to risks of user safety. Metal ferrules also limit the maximum dielectric withstand rating of a multi-pole system due to the ferrules being electrically conductive between the fiberglass pole sections.

The mating sleeve interface of conventional metal ferrules also creates a degree of looseness or "slop" between connections due to the required clearances. This allows more deflection to occur when multiple pole sections are connected than a tight connection would allow. Excessive deflection prevents the user from controlling the pole sections in the most efficient and safe manner desirable.

Thus, there is a long felt need in the art for an improved ferrule system for extension poles.

BRIEF SUMMARY OF THE INVENTION

It is therefore an object of the present invention to provide a ferrule connection interface having a first composite ferrule having an outwardly threaded portion opposite a pole receiving portion, a second composite ferrule having an inwardly threaded portion opposite a pole receiving portion, the inwardly threaded portion tightly meshing with the outwardly threaded portion of the first composite ferrule to form a tight connection. According to the invention, the inwardly threaded portion of the second composite ferrule is recessed sufficiently to form an overlapping sleeve when meshed with the outwardly threaded portion of the first composite ferrule.

According to another embodiment of the invention, both first and second composite ferrules are characterized by a lack of any metallic and/or electrically conductive materials.

According to another embodiment of the invention, a first pole is connected to the first composite ferrule at the pole receiving portion of the first composite ferrule and a second pole is connected to the second composite ferrule at the pole receiving portion of the second composite ferrule.

According to another embodiment of the invention, the first pole is bonded via an engineered adhesive to the first composite ferrule and the second pole is bonded via the engineered adhesive to the second composite ferrule.

According to another embodiment of the invention both the first and second composite ferrules may be made from glass-reinforced polymer.

According to another embodiment of the invention, both the first and second composite ferrules may be high-strength, impact resistant, and resistant to ultraviolet light.

According to another embodiment of the invention, both the first and second composite ferrules may have extremely high electrical resistivity, may be an effective insulator, and may be non-conductive.

According to another embodiment of the invention, the outwardly threaded portion of the first composite ferrule and the inwardly threaded portion of the second composite ferrule may include oversized thread profile for promoting ease of cleaning and quick connection of poles or accessories.

According to another embodiment of the invention, the tight connection may be a strong, rigid connection.

According to another embodiment of the invention, the first and second composite ferrules may be mechanically attached to the respective first and second poles with rivets made from a non-conducive material.

According to another embodiment of the invention, the first and second composite ferrules may each further include surface texture on outer surface of ferrule for improved user grip.

According to another embodiment of the invention, the pole receiving portion of the first and second composite ferrules may each further include surface texture on an inner surface of the pole receiving portion for improved adhesive bond.

According to another embodiment of the invention, a third composite ferrule may have an inwardly or outwardly threaded portion opposite a pole receiving portion, the third composite ferrule connected to the second pole at an end of the second pole opposite the second composite ferrule. According to the invention, the inwardly or outwardly threaded portion is removably attachable to a tool.

According to another embodiment of the invention, the first, second, and third composite ferrules may be characterized by a lack of any metallic and/or electrically conductive materials.

According to another embodiment of the invention, the tool may have an outwardly or inwardly threaded composite ferrule attached to one or more of: a pruner and a rope, a double pulley pruner and a rope, a saw head, a saw blade, a hook saw blade and belting scabbard, and/or a limb and wire raiser. This list is not exhaustive. Other accessories not listed may be used.

According to another embodiment of the invention, the ferrule connection may show no sign of puncture, tracking, or erosion on any surface of the ferrule connection or any perceptible temperature rise when subjected to an alternating voltage of 100 kV rms at a maximum voltage rise of 3000 V/s applied between electrodes spaced 12 inches apart for 5 minutes.

According to another embodiment of the invention, the ferrule connection interface has a first composite ferrule having an outwardly threaded portion opposite a pole receiving portion, a first pole bonded via an engineered adhesive to the first ferrule at the pole receiving portion of the first ferrule, a second composite ferrule having an inwardly threaded portion opposite a pole receiving portion, the inwardly threaded portion tightly meshing with the outwardly threaded portion of the first composite ferrule to form a tight connection, and a second pole bonded via the engineered adhesive to the second ferrule at the pole receiving portion of the second ferrule. According to this specific embodiment, the inwardly threaded portion of the second composite ferrule is recessed sufficiently to form an overlapping sleeve when meshed with the outwardly threaded portion of the first composite ferrule, and both first and second composite ferrules are characterized by a lack of any metallic and/or electrically conductive materials.

According to another embodiment of the invention, the method for connecting sections of an extension pole includes providing a first composite ferrule having an outwardly threaded portion opposite a pole receiving portion and a second composite ferrule having a recessed inwardly threaded portion defining an overlapping sleeve opposite a pole receiving portion, connecting the pole receiving portion of the first composite ferrule to a first pole, connecting the pole receiving portion of the second composite ferrule to a second pole, and then tightening the outwardly threaded portion of the first composite ferrule to the inwardly threaded portion of the second composite ferrule to form a tight connection with the overlapping sleeve of the second composite ferrule overlapping at least a portion of the pole receiving portion of the first composite ferrule.

According to another embodiment of the invention, the method for connecting sections of an extension pole includes connecting a third composite ferrule having an outwardly or inwardly threaded portion opposite a pole receiving portion to the second pole on an end opposite the second composite ferrule, and connecting a tool to the outwardly or inwardly threaded portion of the third composite ferrule.

According to another embodiment of the invention, the tool is one or more of: a pruner and a rope, a double pulley pruner and a rope, a saw head, a saw blade, a hook saw blade and belting scabbard, and/or a limb and wire raiser. This list is not exhaustive. Other tools not listed may be used.

In at least one advantageous embodiment, a ferrule and pole system includes: a first composite ferrule having an outwardly threaded portion opposite a pole receiving portion; a second composite ferrule having a recessed inwardly threaded portion defining an overlapping sleeve opposite a pole receiving portion; and a first pole having an end inserted into the pole receiving portion of the first composite ferrule. The outwardly threaded portion of the first composite ferrule is engaged with the inwardly threaded portion of the second composite ferrule with the overlapping sleeve of the second composite ferrule overlapping at least a portion of the pole receiving portion of the first composite ferrule. A first diametric step defined by a diameter of an exterior of the pole receiving portion of the first composite ferrule is greater than a diameter of an exterior of the first pole; and a second diametric step defined by a diameter of an exterior of the overlapping sleeve of the second composite ferrule is greater than the diameter of the exterior of the pole receiving portion of the first composite ferrule.

In at least one advantageous embodiment, a ferrule and pole system includes: a first composite ferrule having an outwardly threaded portion opposite an unthreaded pole receiving portion; and a second composite ferrule having a recessed inwardly threaded portion at an internal end of an unthreaded overlapping sleeve opposite an unthreaded pole receiving portion. The pole receiving portion of the first composite ferrule is connected to a first pole by insertion of an end of the first pole into the unthreaded pole receiving portion of the first composite ferrule. The outwardly threaded portion of the first composite ferrule engages the inwardly threaded portion of the second composite ferrule such that the unthreaded overlapping sleeve of the second composite ferrule overlaps at least a portion of the unthreaded pole receiving portion of the first composite ferrule and overlaps at least a portion of the end of the first pole inserted into the unthreaded pole receiving portion of the first composite ferrule.

In at least one embodiment, a ferrule system includes: a first ferrule comprising a proximal end for engaging a first implement and a threaded portion opposite the proximal end; and a second ferrule comprising a distal portion for engaging a second implement, a proximal portion opposite the distal portion and comprising teeth, a threaded portion intermediate the distal portion and proximal portion and configured to engage the threaded portion of the first ferrule. Teeth are mounted on the first ferrule and are biased to automatically engage the teeth of the proximal portion of the second ferrule as the threaded portion of the first ferrule engages the threaded portion of the second ferrule such that only tightening rotation of the second ferrule relative to the first ferrule is permitted when the teeth mounted on the first ferrule are automatically engaged with the teeth of the proximal portion of the second ferrule.

A lever may be mounted on the first ferrule, the teeth mounted on the first ferrule being connected to the lever, the lever biased by a bias force to automatically pivot to a default locking position at which the teeth mounted on the first ferrule automatically engage the teeth of the proximal portion of the second ferrule.

The lever can be operated by a user by being moved against the bias force, thereby pivoting the lever out of the default locking position, and disengaging the teeth mounted on the first ferrule from the teeth of the proximal portion of the second ferrule.

In some examples, the proximal portion of the second ferrule includes an interior wall, the teeth of the proximal portion of the second ferrule extend inward from the interior wall, and the teeth mounted on the first ferrule are connected to a distal end of the lever and extend outward.

The distal end of the lever is inserted into the proximal portion of the second ferrule as the threaded portion of the first ferrule engages the threaded portion of the second ferrule.

In some examples, the teeth mounted on the first ferrule include respective distal ends having sloped surfaces; and the teeth of the proximal portion of the second ferrule include respective proximal ends each having a sloped surface.

The threaded portion of the first ferrule can be inserted into the proximal portion of the second ferrule, such that the sloped surfaces of the teeth of the proximal portion of the second ferrule make contact with the sloped surfaces of the teeth mounted on the first ferrule thereby pushing the distal end of the lever inward to ease mutual engagement of the teeth.

The teeth of the proximal portion of the second ferrule can define a ring of teeth encircling a longitudinal axis defined by the second ferrule.

The teeth of the proximal portion of the second ferrule may each have a profile when taken along the longitudinal axis in the shape of a right triangle.

The teeth of the proximal portion of the second ferrule may each include: a base connected to the interior wall; a locking side oriented perpendicular to the base and extending towards the longitudinal axis; and a hypotenuse face that forms a slope.

The teeth mounted on the first ferrule may each include: a base connected to the lever; a locking side oriented perpendicular to the base and extending outward; and a hypotenuse face that forms a slope.

In some examples, during tightening rotation of the second ferrule relative to the first ferrule the hypotenuse faces of the teeth mounted on the first ferrule slide along the hypotenuse faces of the teeth of the proximal portion of the second ferrule causing the lever to pivot from its default locking position.

The teeth mounted on the first ferrule may be connected to a distal end of the lever along an arc of curvature that matches the ring of teeth within the female ferrule for intimate mutual engagement.

A distal end of the lever may include a tab trapped in a slot defined by the male ferrule thereby movably coupling the distal end of the lever to the male ferrule and preventing the lever from swinging therefrom.

In some examples, the proximal end of the first ferrule includes a first tube; and the distal portion of the second ferrule includes a second tube.

A first implement and a second implement may be included, for example for use in reach extension, the first implement being a first pole have an end portion inserted in the first tube; and the second implement being a second pole have an end portion inserted in the second tube.

A first implement and a second implement may be included wherein: the first implement is a pruner and a rope, a double pulley pruner and a rope, a saw head, a saw blade, a hook saw blade and belting scabbard, and/or a limb and wire raiser, wherein this list is not exhaustive, wherein other accessories not listed may be used; and the second implement is a pruner and a rope, a double pulley pruner and a rope, a saw head, a saw blade, a hook saw blade and belting scabbard, and/or a limb and wire raiser, wherein this list is not exhaustive, wherein other accessories not listed may be used.

The lever may have several teeth, which allows engagement of these several teeth with an equal number of teeth on the female ferrule.

The above summary is to be understood as cumulative and inclusive. The above and below described features are to be understood as combined in whole or in part in various embodiments whether expressly described herein or implied by at least this reference. For brevity, not all features are expressly described and illustrated as combined with all other features. No combination of features shall be deemed unsupported for merely not appearing expressly in the drawings and descriptions.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
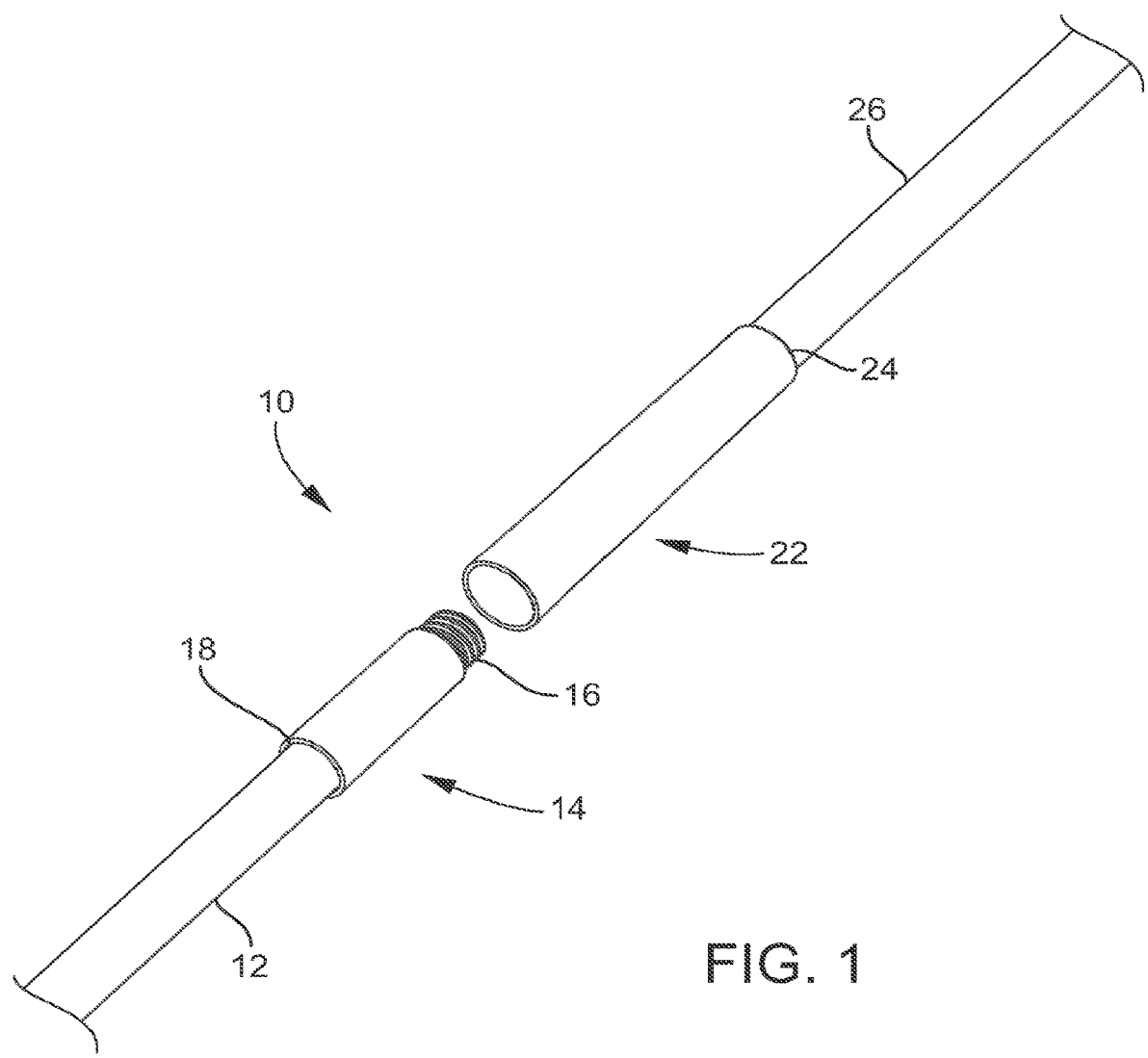
FIG. 1 is an exploded perspective view of an embodiment of the invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing. Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

A preferred embodiment according to the invention is described in detail below. The invention is a non-conductive ferrule connection interface having a screw-together threaded design 10. The ferrules facilitate attaching one or more poles together to form an extension pole such that a tool may be attached.

As shown in FIGS. 1-12, the invention 10 includes a first pole 12 attached to a first composite ferrule 14. The first composite ferrule 14 has an outwardly threaded portion 16 and a pole receiving portion 18. The first pole 12 is attached to the pole receiving portion 18. As shown, the pole receiving portion 18 is a female receiver that has a diameter just larger than the diameter of the first pole 12. An engineering adhesive is applied to the receiving portion 18 and fixes the first pole 12 to the first composite ferrule 14. Further, a first rivet 20 is attached to the first pole 12 and the first composite ferrule 14. This fixed attachment ensures a solid, immovable connection between the first pole 12 and the first composite ferrule 14.

A second composite ferrule 22 is made in like manner to the first composite ferrule 14. The second composite ferrule 22 has a pole receiving portion 24 for receiving a second pole 26 and an inwardly threaded portion 28. The threads of the inwardly threaded portion 28 are recessed sufficient to form an overlapping sleeve 30 when meshed with the outwardly threaded portion 16 of the first composite ferrule 14. This feature is shown disassembled in FIG. 2 and assembled in FIG. 3. Like the first ferrule 14, second composite ferrule pole receiving portion 24 has a diameter just larger than the diameter of the second pole 26. An engineering adhesive is applied to the receiving portion 24 and fixes the second pole 26 to the second composite ferrule 22. The overlapping sleeve 30 is a female receiver which overlaps the first composite ferrule 14 when assembled to provide additional rigidity to the connected poles. Additional engineering adhesive may be applied to the overlapping sleeve 30 to fix the second composite ferrule 22 to the first composite ferrule 14. Further, a second rivet 32 is attached to the second pole 26 and the second composite ferrule 22. This fixed attachment ensures a solid, immovable connection between the second pole 26 and the second composite ferrule 22.

Figure 2:
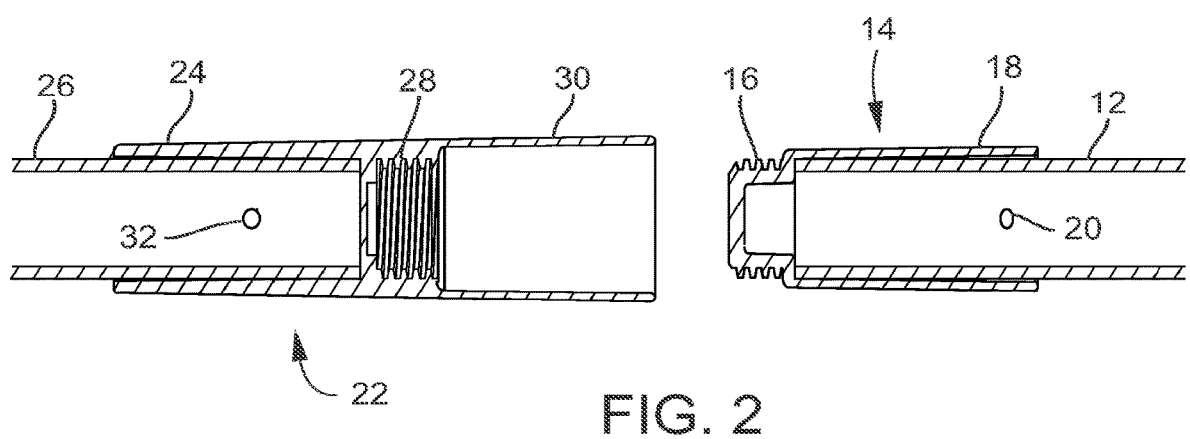
FIG. 2 is an exploded side cutaway view of an embodiment of the invention.
Figure 3:
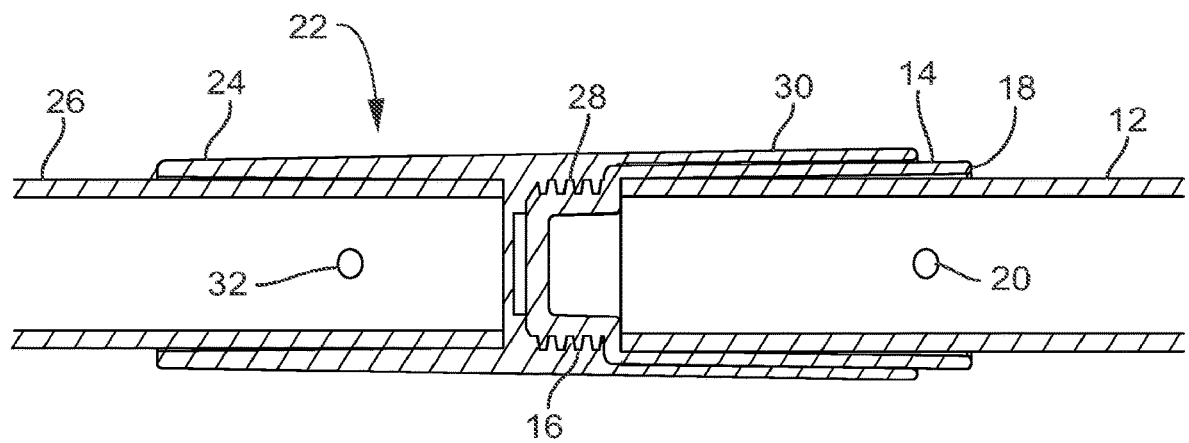
FIG. 3 is a side cutaway view of an embodiment of the invention.
Figure 4:
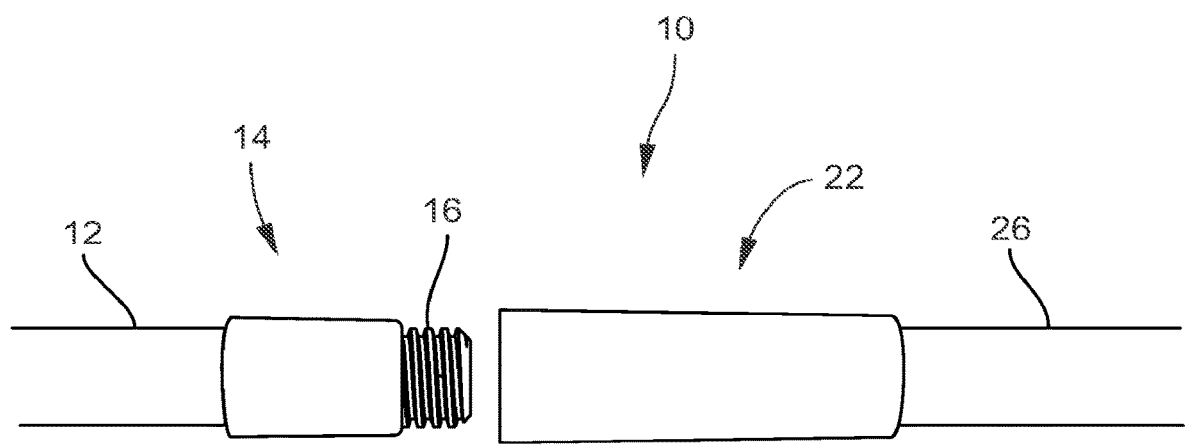
FIG. 4 is an exploded side view of an embodiment of the invention.

The overlapping sleeve 30 of the second composite ferrule 22 may be of a sufficient length to completely overlap and cover the first composite ferrule 14, may be of a relatively greater length, or may be of a relatively shorter length such that the first composite ferrule 14 is not completely overlapped. FIG. 3 shows the overlapping sleeve 30 of a length which does not completely cover the first composite ferrule 14. Along the same lines, the rivets 20, 32 may only pass through their respective ferrules 14, 22 and poles 12, 26 or may pass through both the first and second composite ferrule 14, 22. Specifically, as shown in FIG. 2, the rivet 20 may pass through the overlapping sleeve 30 of the second composite ferrule 22, the pole receiving portion 18 of the first composite ferrule 14 and finally the first pole 12.

Figure 5:
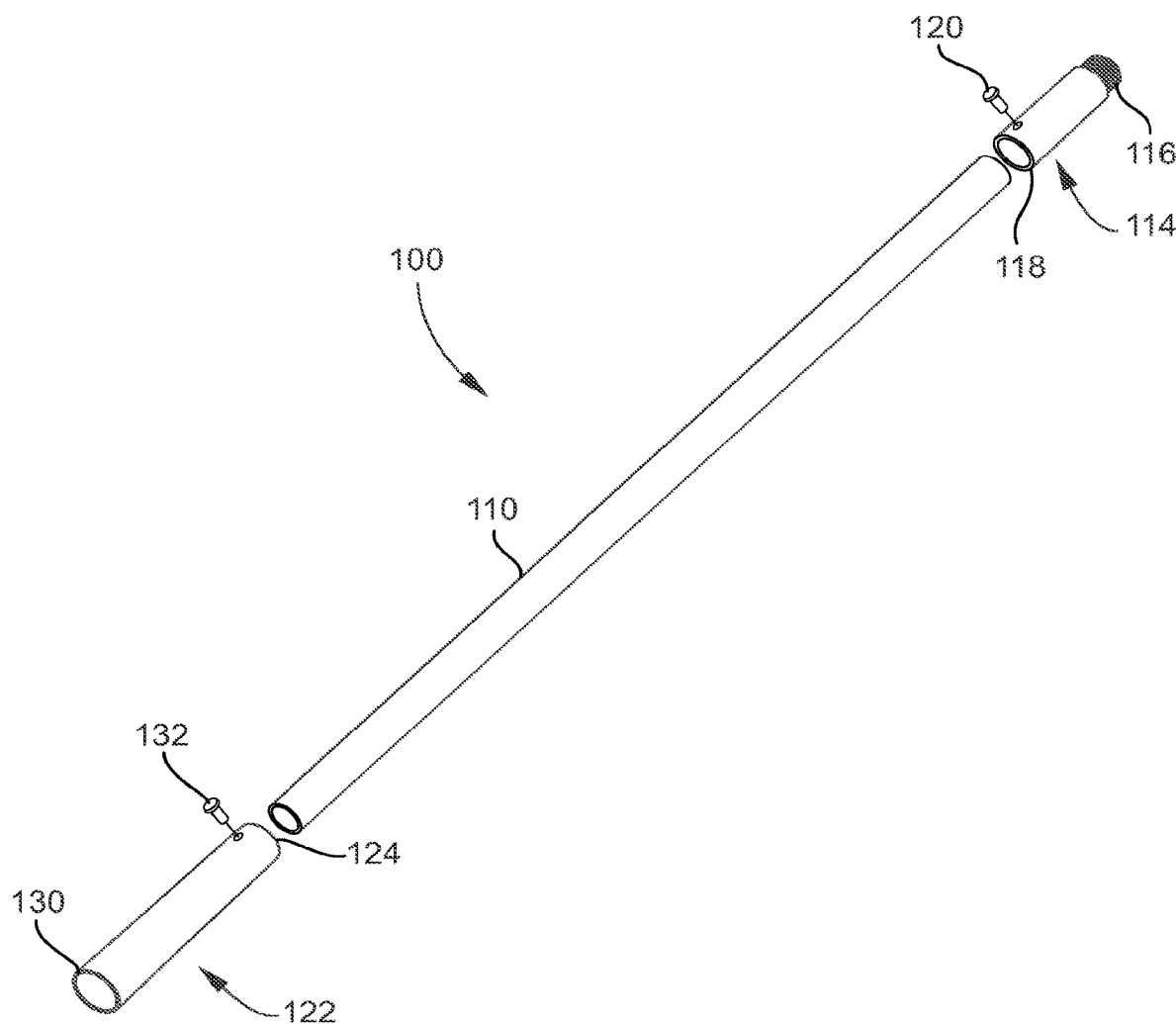
FIG. 5 is an exploded perspective view of an embodiment of the invention.
Figure 6:
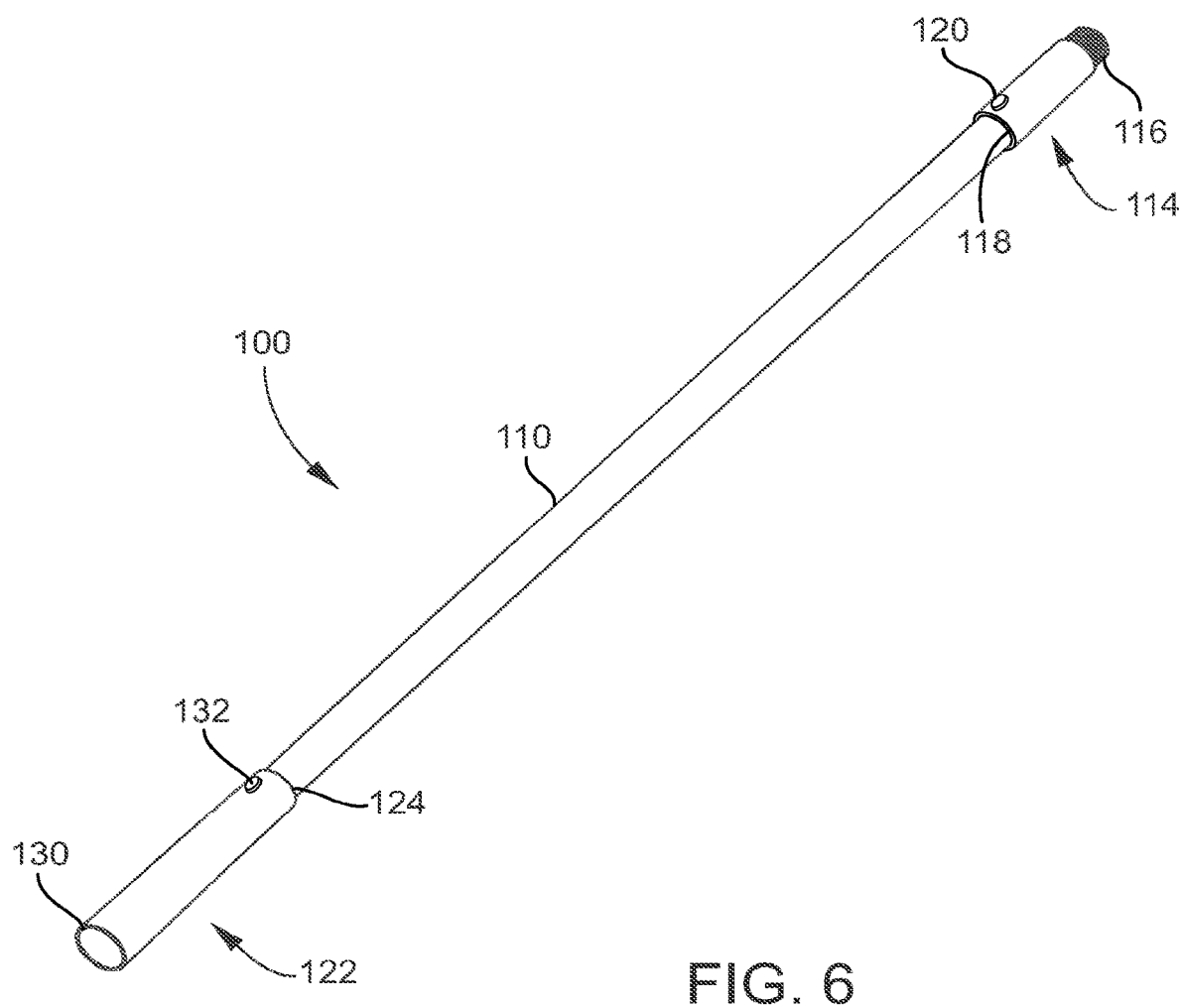
FIG. 6 is a perspective view of an embodiment of the invention.

FIGS. 5 and 6 show an example pole section 100 with a first composite ferrule 114 on one end of a pole 110 and a second composite ferrule 122 on an opposing end of the pole 110. The first composite ferrule 114 has an outwardly threaded portion 116 and a pole receiving portion 118. The second composite ferrule 122 has an inwardly threaded portion (not shown) recessed in an overlapping sleeve 130 and a pole receiving portion 124. Rivets 120, 132 connect the first and second composite ferrules 114, 122 to the pole 110. Each respective ferrule 114, 122 may be mated with a corresponding ferrule 114, 122. Another pole section (not shown) with another first composite ferrule on one end may be mated to the second composite ferrule 122 of the example pole section 100 and vice versa with the first composite ferrule 114 on the example pole section 100. As many pole sections as desired may be attached together in such a manner.

Figure 7:
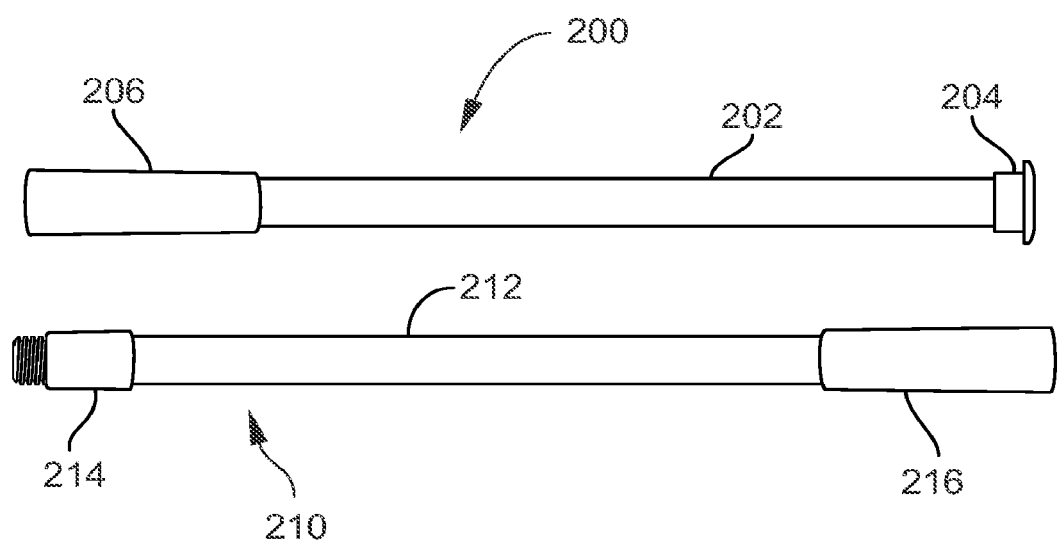
FIG. 7 is a side view of an unassembled embodiment of the invention.

A terminal end pole section 200 and an extension pole section 210 are shown in FIG. 7. The terminal end pole section 200 has a pole 202 with a second composite ferrule 206 on one end and a terminal stopper 204 on the opposing end. The terminal stopper 204 may be just a rubber stopper, or may be an ergonomic handle. A pole extension section 210 with a pole 212 and first and second composite ferrules 214, 216 on opposing ends would be attached to the second composite ferrule 206 of the terminal end pole section 200 in order to assemble the extension pole.

Figure 8:
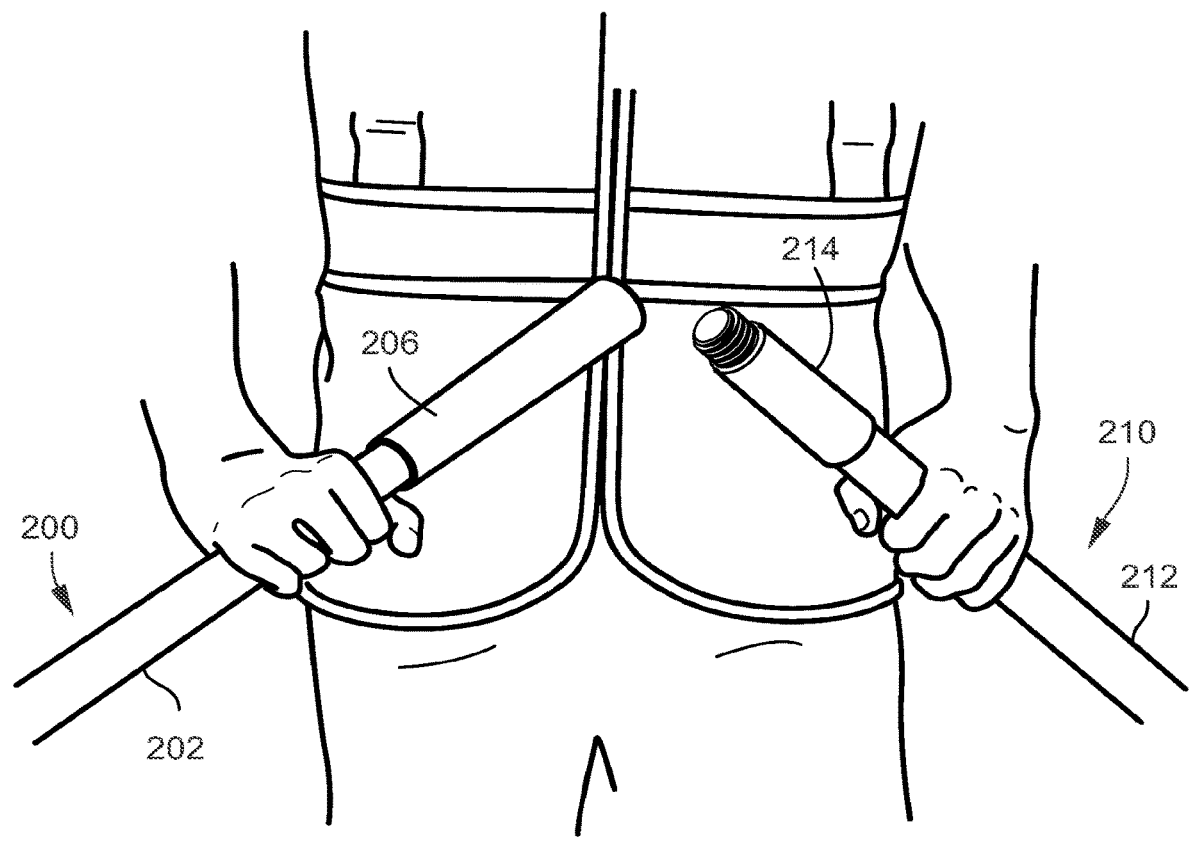
FIG. 8 is a perspective view of an embodiment of the invention.

Each pole extension section 210 may be assembled by attaching first and second composite ferrules 206, 214 to each end of the poles 202, 212 and applying engineering adhesive as needed to secure the ferrules 206, 214 to the ends of the poles 202, 212. As shown in FIG. 8, assembly of pole extension sections 202, 210 is performed by twisting together coordinating composite ferrules 206, 214 in order to thread the inwardly and outwardly threaded portions together. Additional engineering adhesive may be applied prior, during, or after threading the pole extension sections 202, 210 together. Rivets may be attached prior to assembly of multiple pole extension sections or may be attached after the pole extension sections have been connected.

One of skill in the art will understand that multiple sections and combinations of ferrules and poles may be extended together depending upon a particular application. That is, there may be a first, second, third, fourth, fifth, etc. . . . ferrules connecting in series first, second, third, fourth, etc. . . . poles.

Figure 9:
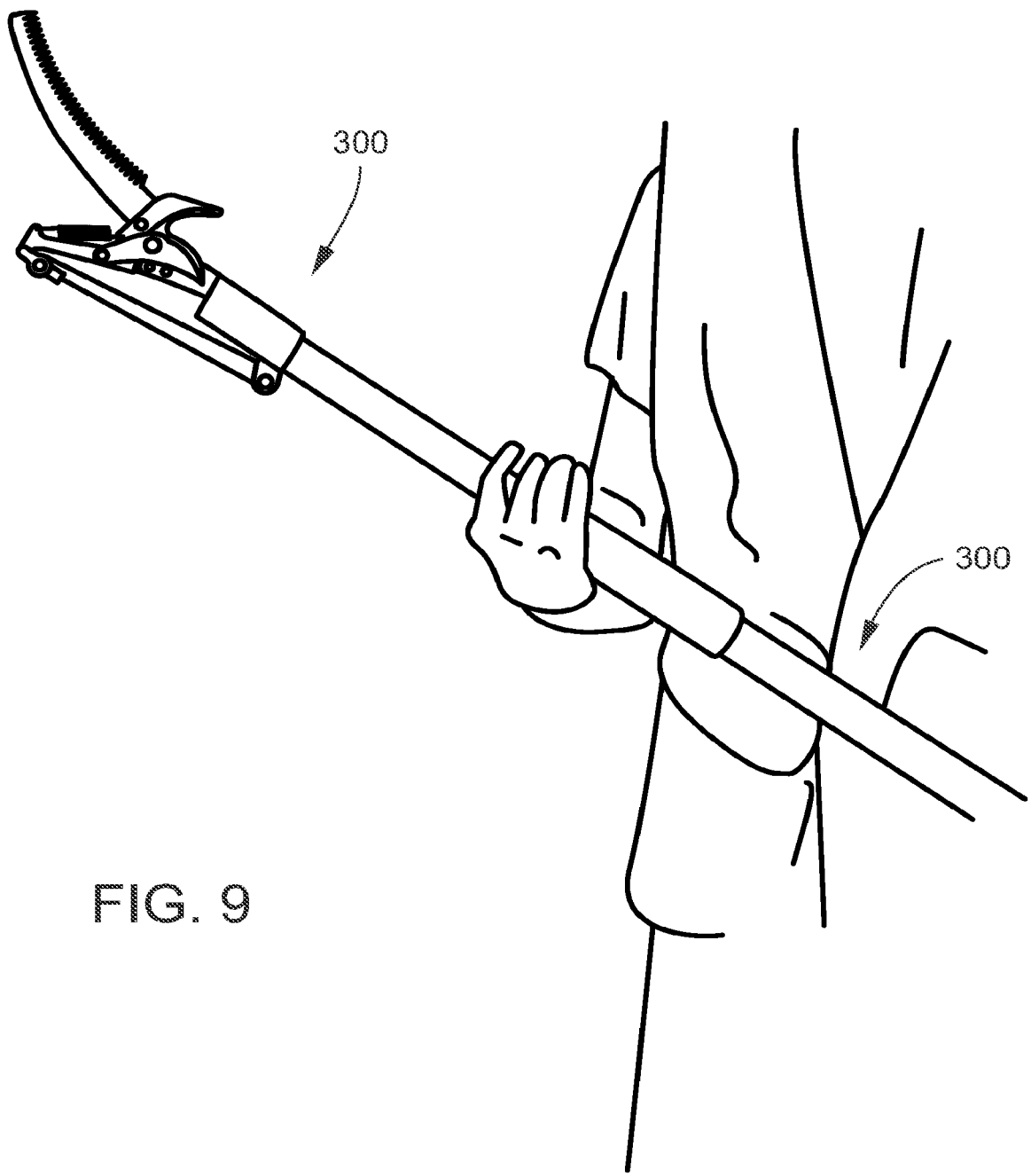
FIG. 9 is perspective view of a tool end portion of the invention.
Figure 10:
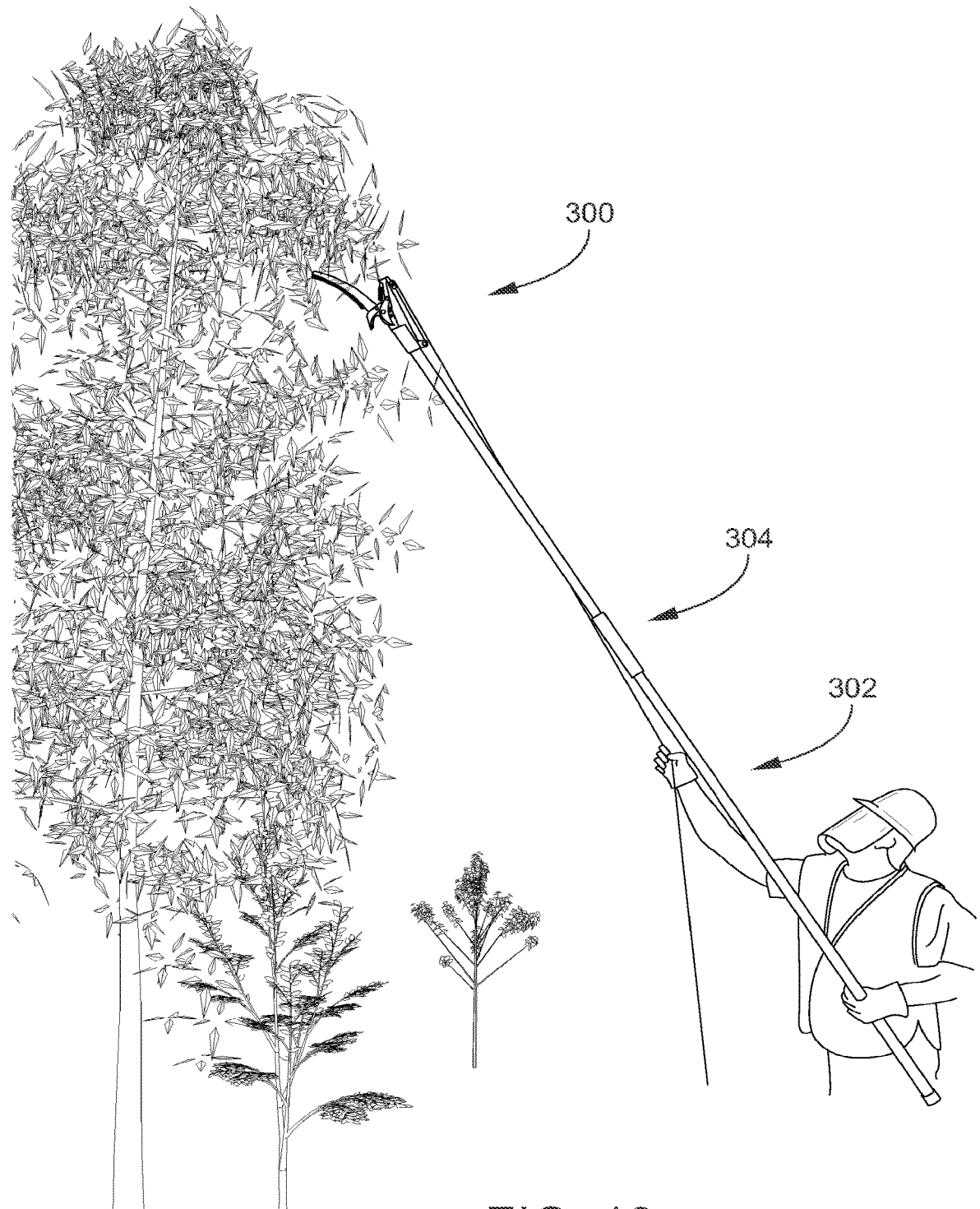
FIG. 10 is a perspective view of an embodiment of the invention in use.

As shown in FIGS. 9 and 10, at the end of the series, rather than a further pole, a tool 300 may be attached to a final pole section 302. The tool 300 may be: a pruner and a rope, a double pulley pruner and a rope, a saw head, a saw blade, a hook saw blade and belting scabbard, and/or a limb and wire raiser. This list is not exhaustive. Other things not listed may be used. The final pole section 302 may have an additional ferrule 304 which connects the tool 300 to the final pole section 302. The additional ferrule 304 may be similar to the aforementioned first composite ferrule 14 and have an outwardly threaded portion opposite a pole receiving portion or may be similar to the aforementioned second composite ferrule 22 and have an inwardly threaded portion opposite a pole receiving portion. The tool 300 may have a corresponding outwardly or inwardly threaded portion adapted to connect to the additional ferrule 304. The additional ferrule 302 may have one or more rivets.

Both the first and second ferrules 14, 22 are made from a composite non-conductive material. This material may be a fiber reinforced composite to maintain insulating properties across the pole sections. This material may be a fiber reinforced polyamide. The material may be high-strength to minimize cracks and stress and strain failures. The material may also be impact resistant and ultraviolet light resistant. Rivets 20, 32 may also be made of the same material as the first and second ferrules 14, 22 or made of a different non-conductive suitable material. Each ferrule 14, 22 may have one or more rivets or may have no rivets. The additional ferrule 302 may be made of the same material as the first and second ferrules 14, 22 or may be made of a different suitable material.

The non-conductive composite ferrules enhance dielectric strength from top to bottom, improving user safety while performing tree trimming and line clearance around overhead utility lines. Surfaces on the inner and outer diameters of the pole receiving portions of both ferrules, and the outer diameter of the poles may have textures to improve grip or adhesive bond.

The outwardly threaded and inwardly threaded portions of the first and second ferrules have over-sized thread profiles in order to provide strong secure pole-to-pole connections. This connection eliminates loose fitment or "slop" problems which are present in metallic designs. The overlapping sleeve 30 and the threaded connection allows a secure and tight fit that is free from any movement, play, or slop once connected. This prevents unwanted deflection from occurring at the ferrule connection, which assists the user by improving balance and control, allowing more accurate positioning of the tool at the end of the pole on or near the branch to be cut. Conventional aluminum ferrule connections allow a deflection within the connection of at least 1°. As the aluminum ferrule wears out from normal use, it can deform and further increase this deflection angle. This deflection angle is multiplied by the total number of ferrules in the pole system. This total deflection prevents optimal use since it is more difficult to balance and control the placement of the tool. The result of the present connection is improved rigidity to the entire working length of the assembled pole system. In addition, the resulting connection is less binding, easy to clean, and quicker to assemble extension sections and tools or accessories.

Figure 11:
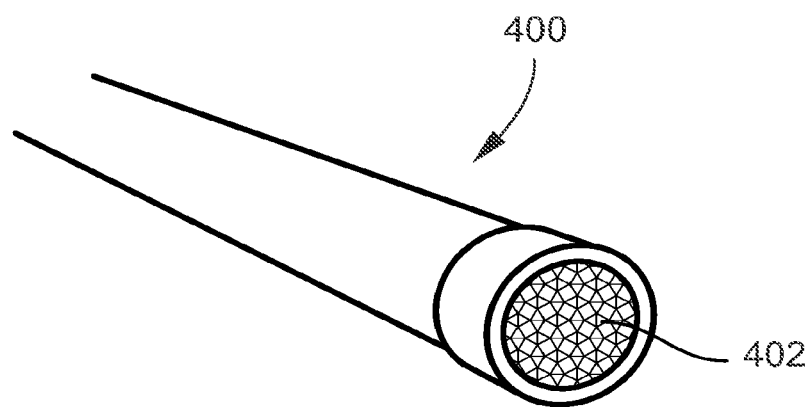
FIG. 11 is a perspective view of a foam filled pole embodiment of the invention.
Figure 12:
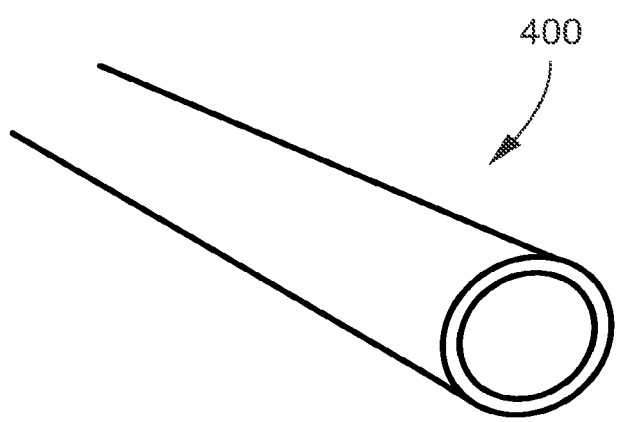
FIG. 12 is a perspective view of a hollow pole embodiment of the invention.
Figure 13:
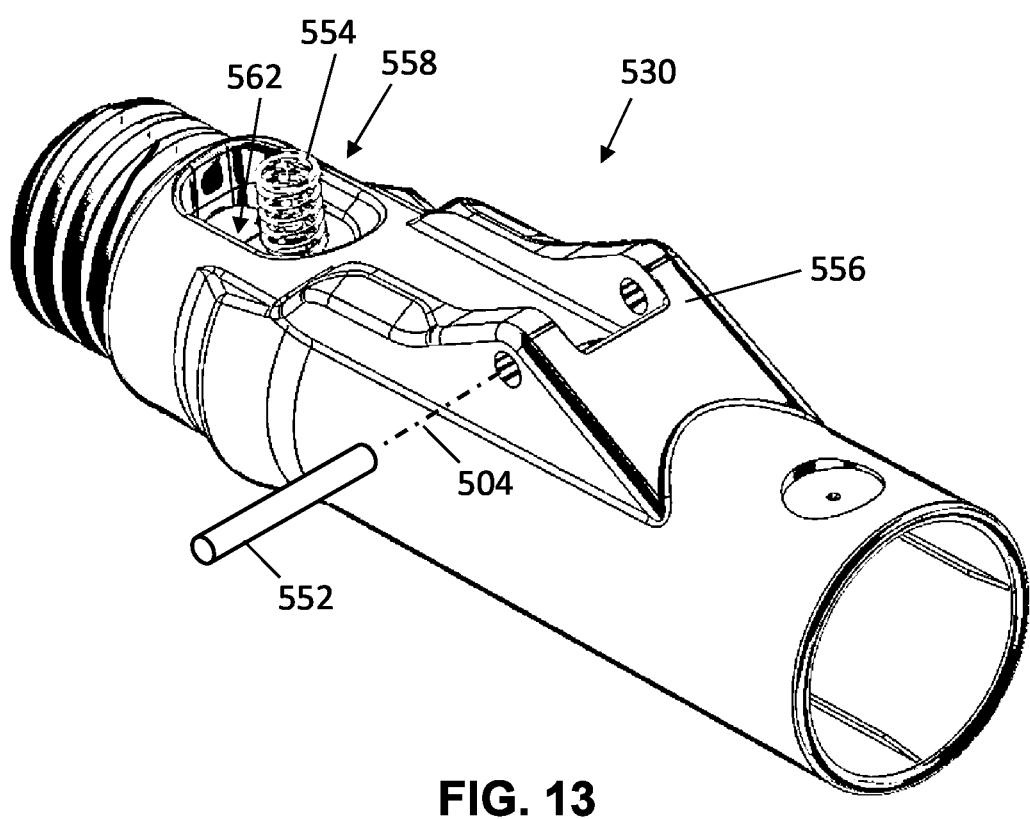
FIG. 13 is a perspective view of a male ferrule from a proximal end, according to at least one embodiment, shown with components of a unidirectional anti-twist mechanism in partial disassembly.
Figure 14:
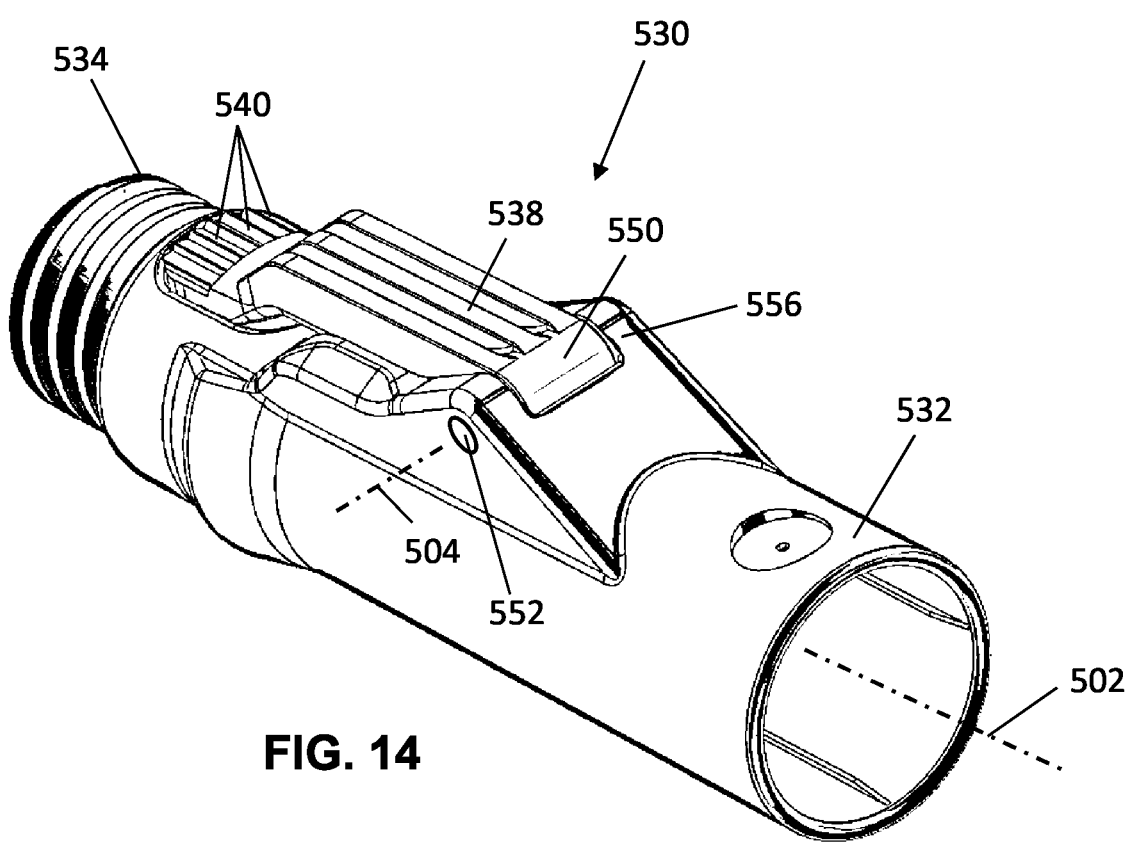
FIG. 14 is a perspective view of the male ferrule as in FIG. 13, with the anti-twist mechanism assembled.
Figure 15:
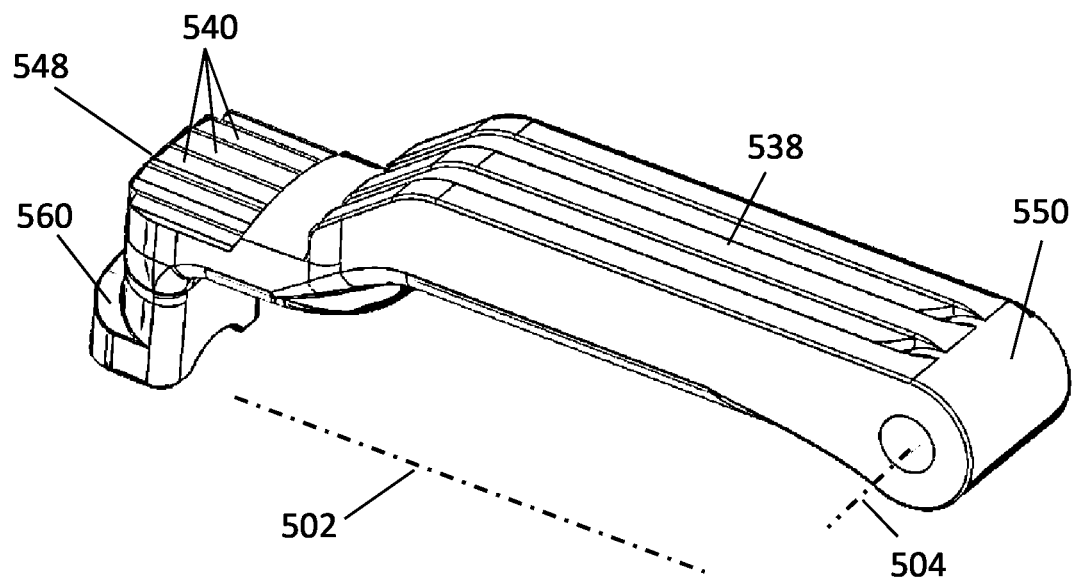
FIG. 15 is a perspective view of the separated lever of the anti-twist mechanism.

The pole may be made from a composite or from a fiberglass, or glass-reinforced polymer. As shown in FIGS. 11 and 12, the poles may be hollow or filled with foam 402. Foam filled poles may be preferred for aerial construction and line clearance. Hollow core poles may be preferred for tree trimming and aerial construction. The hollow core pole may be stronger and lighter than the foam core pole.

The non-conductive composite ferrule connection interface having a screw-together threaded design according to the present invention are built with fiber reinforced composite ferrules to maintain insulating properties across pole sections for line-clearance, tree trimming, and to provide more secure pole connections for all users, from telecom installers to professional arborists and landscapers. The ferrule connection of the present invention shows no sign of puncture, tracking, or erosion on any surface of the ferrule connection or any perceptible temperature rise when subjected to an alternating voltage of 100 kV rms at a maximum voltage rise of 3000 V/s applied between electrodes spaced 12 inches apart for 5 minutes.

FIGS. 13-20 illustrate a ferrule system 500 (FIG. 20), and components thereof (FIGS. 13-19), useful for reach extension. The system 500 includes a ratcheting unidirectional anti-twist mechanism that automatically locks to maintain the threaded engagement of a male ferrule and female ferrule. A spring loaded lever carried by a first ferrule, termed a male ferrule 530, has a toothed chuck biased into ratcheting engagement with a second ferrule, termed a female ferrule 510, automatically permitting only tightening unidirectional rotation of the female ferrule relative to the male ferrule until user action on the lever disengages the chuck from the female ferrule.

The male ferrule 530 has a proximal end for engaging a first pole or other implement or accessory, and a distal end opposite the proximal end, for engaging the female ferrule. Similarly, the female ferrule has a proximal end for engaging the distal end of the male ferrule. The female ferrule has a distal end, opposite the proximal end, for engaging a second pole or other implement or accessory. The terms proximal and distal serve as an intuitive convention in the below descriptions for components of the ferrule system without limiting such components to such terms. This convention intuitively relates to a users perspective grasping the male ferrule and/or the first pole to support and extend the female ferrule and second pole. A ferrule system according to these descriptions can be grasped and wielded according to tentative needs and choices of use.

Figure 20:
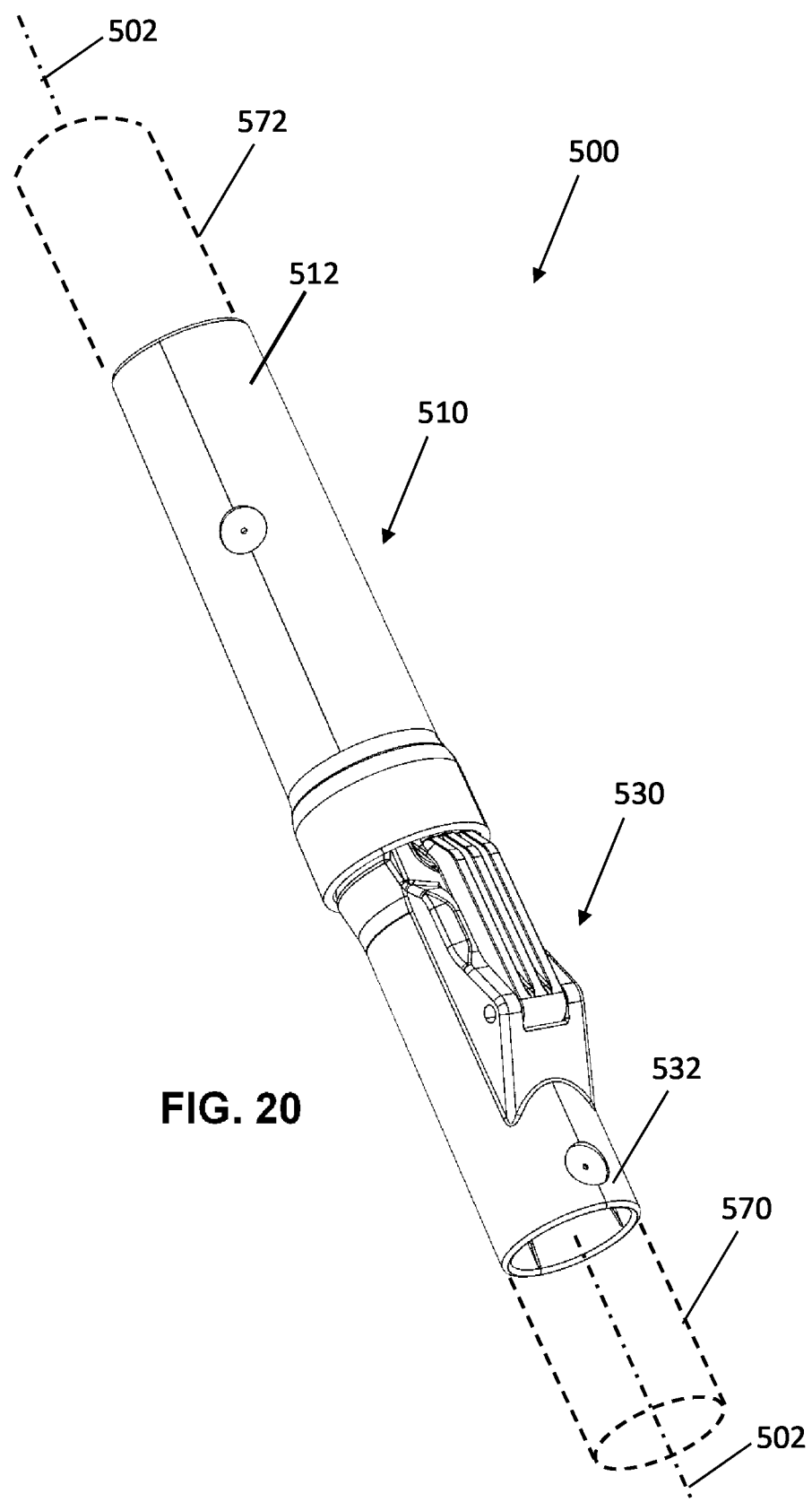
FIG. 20 is a perspective view of a ferrule system including the male ferrule of FIG. 14 and the female ferrule of FIGS. 17-19 engaged.

The female ferrule 510 (FIG. 17) has a distal portion 512 configured for attachment to or mounting on an accessory such as a pole as represented in FIG. 20. In the illustrated embodiment the distal portion 512 is shaped as a hollow circular cylindrical tube extending along a longitudinal axis 502. The distal portion 512 has an unthreaded interior, such that it can be permanently attached to a pole or other attachment. The female ferrule 510 also includes an inward threaded portion 514 intermediate the distal portion and a proximal portion 516 thereof. The threaded portion 514 is designed to be compatible with and engage an externally threaded distal portion of the male ferrule 530. Threads are formed inside the threaded portion 514 of the female ferrule, spaced from the terminal edge of the proximal portion 516.

An interior wall 518 in the longitudinally extending space between the proximal end of the threads and the terminal edge of the proximal portion 516 of the female ferrule is occupied by a plurality of teeth 520, which extend inward around the whole inner perimeter of the wall along the space. These teeth 520 are prism-shaped, with their axes parallel to the longitudinal axis 502 (FIG. 17) of the female ferrule. Each of these teeth has a cross section, or profile when taken along the longitudinal axis, in the shape of a right triangle, with its base 522 (FIG. 18) oriented tangent to the circumferential perimeter of the ferrule and connected to the interior wall. A locking side 524 is oriented perpendicular to the base 522 and extends towards the inside of the ferrule. The hypotenuse face 526 forms a slope whose plane is parallel to the axis of the ferrule. These teeth 520 have a height and length such that they are compatible with and can engage with teeth on the spring-loaded lever pivotally mounted on the male ferrule. The sloped hypotenuse face 526 of each tooth 520 is oriented such that it will mesh with the corresponding sloped hypotenuse faces of the teeth on the male ferrule.

The male ferrule 530 (FIG. 14) has a proximal end 532 configured for attachment to or mounting on an accessory such as a pole as represented in FIG. 20. In the illustrated embodiment the proximal end 532 is shaped as a longitudinally extending hollow circular cylindrical tube. The male ferrule 530 can be attached to a pole or other attachment by insertion of same into the proximal end 532. The male ferrule 530 includes an outward threaded portion 534 defining its distal end, similar to the first composite ferrule 14, and designed to be compatible with and engage with the threads formed inside the threaded portion 514 of the female ferrule 510. The male ferrule 530 extends along a longitudinal axis, which is referenced as the longitudinal axis 502 noting the longitudinal axis of the male ferrule 530 and that of the female ferrule 510 are aligned when the two are engaged and can thus be commonly referenced in the drawings. The terms inward and outward in the below descriptions refer to respective directions toward and away from the longitudinal axis.

The male ferrule 530 carries a ratcheting unidirectional anti-twist mechanism defined in part by a spring loaded and pivotally mounted lever 538. The longitudinally extending lever 538 is mounted on the outer perimeter of the male ferrule 530, with its distal end close to the outward threaded portion 534 and its proximal end close to the proximal end 532. This lever 538 has a convenient width such that a plurality of teeth 540 are accommodated extending outward along its width at a chuck 548, which defines the distal end of the lever. These teeth 540 follow an arc of curvature 536 (FIG. 16) that is concentric with the body of the male ferrule and matingly matches the curvature of the ring of teeth 520 within the female ferrule 510 for intimate mutual engagement of the teeth 520 and teeth 540. The teeth 540 are prism-shaped, and their axes extend longitudinally and parallel to the longitudinal axis 502, and the teeth 520.

Each of these teeth 540 has a cross section, or profile when taken along the longitudinal axis, in the shape of a right triangle, with its base 542 connected to the lever 538 by way of the chuck 534, and oriented tangent to the perimeter of the ferrule, a locking side 544 oriented perpendicular to the base and directed outward away from the center of the ferrule, and a sloped hypotenuse face 546 forming a slope whose plane is parallel to the axis 502 of the ferrule. These teeth 540 have a height and length such that they are compatible and can engage with the teeth 520 of the female ferrule 510. The sloped hypotenuse face 546 of each tooth 540 is oriented such that it will mesh with the corresponding sloped hypotenuse faces 526 of the teeth 520 of the female ferrule 510.

The proximal end of the lever 538 has a transversely bored pivot point 550 that is pivotally attached to a pivot support mount 556 on the exterior of the male ferrule 530, for example by a pivot pin 552 (FIG. 13) serving as an axle in the illustrated embodiment. A pivot axis 504 of rotation of this attachment is perpendicular to and displaced from the axis 502 of the ferrule. Between the lever 538 and the male ferrule, near distal end of the lever, right below the teeth 540, a spring 554 (FIG. 13) is trapped in a outer recess 558 defined by exterior of the ferrule 530. The spring 554 persistently biases the lever 538 to pivot outward to a default locking position of the lever such that the functional diameter of the ferrule is increased and the teeth 540 are automatically engaged with the teeth 520. The distal end of the chuck 548 (FIG. 15) has a longitudinally forward extending tab 560 trapped in a slot 562 (FIG. 13) in the male ferrule distally forward of the recess 558, further trapping the spring 554 and movably coupling the distal end of the lever 538 to the male ferrule 530, preventing the distal end of the lever from swinging free from the distal end of the male ferrule 530 and around the axis 504. A longitudinally extending contoured top surface of the lever 538 between the pivot point 550 and teeth 540 is large enough to accommodate at least a gloved human finger. The lever 538 is thus operable by being pressing inward against the bias force of the spring 554, thereby pivoting the lever 538 inward toward the longitudinal axis 502, out of the default locking position, and disengaging the teeth 540 from the teeth 520.

Figure 16:
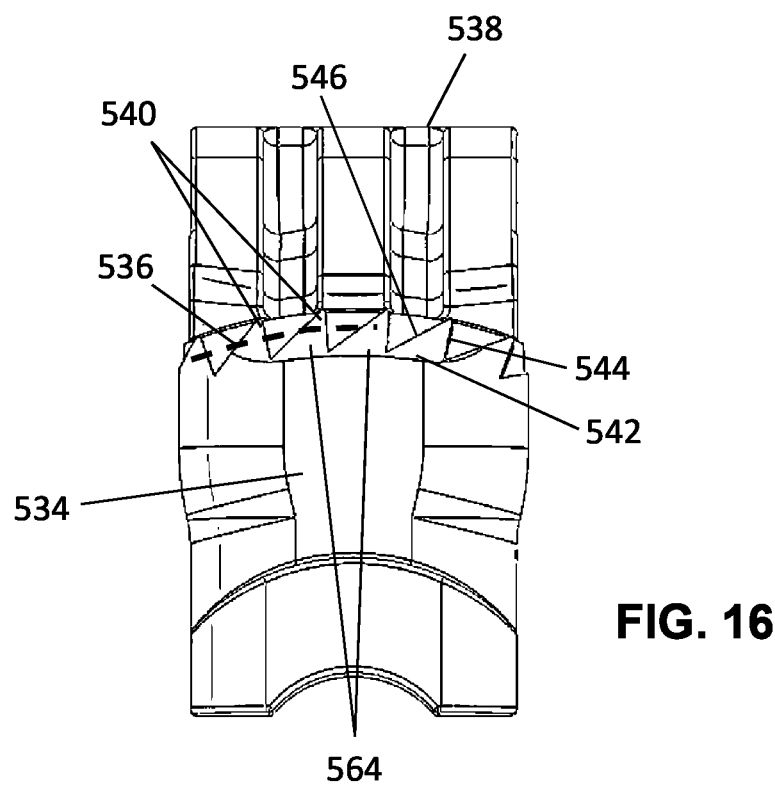
FIG. 16 is a distal end view of the lever of FIG. 15.
Figure 17:
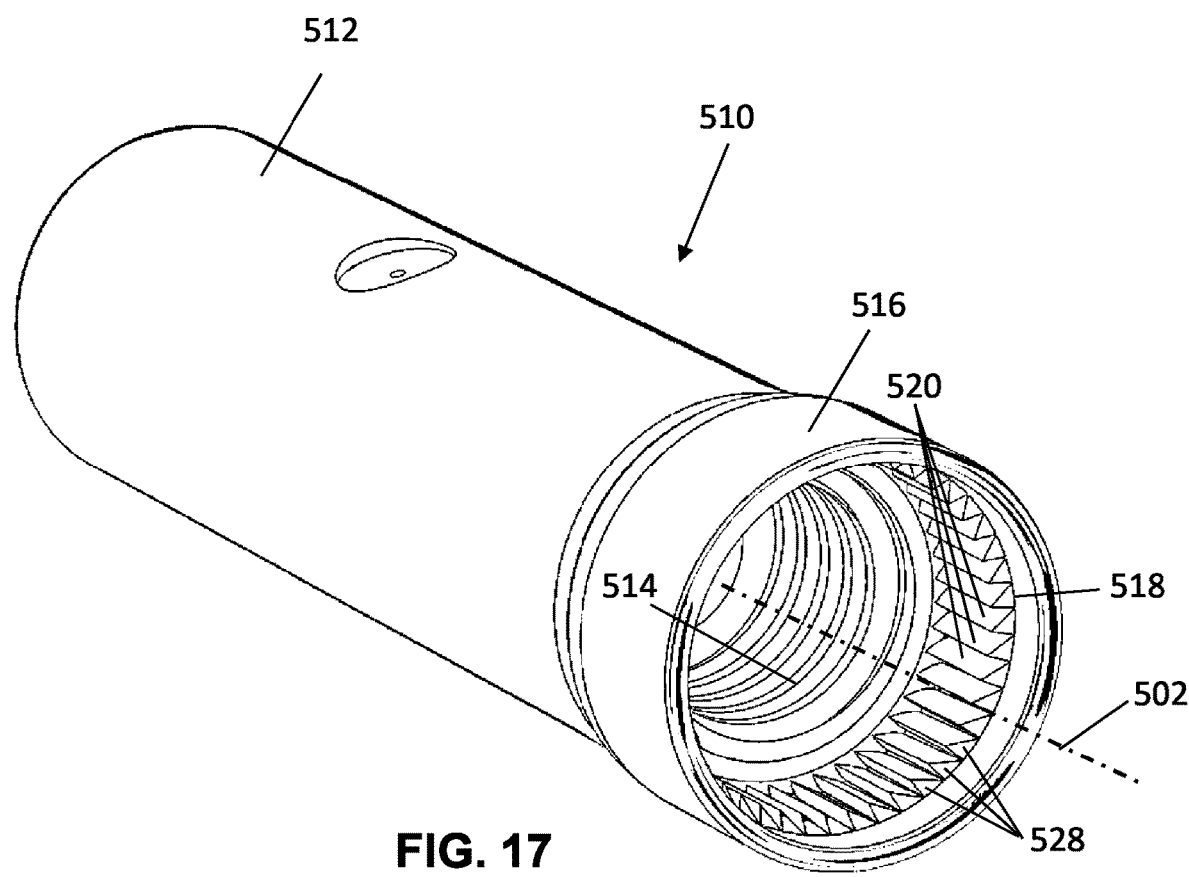
FIG. 17 is a perspective view of a female ferrule from the proximal end, according to at least one embodiment.
Figure 18:
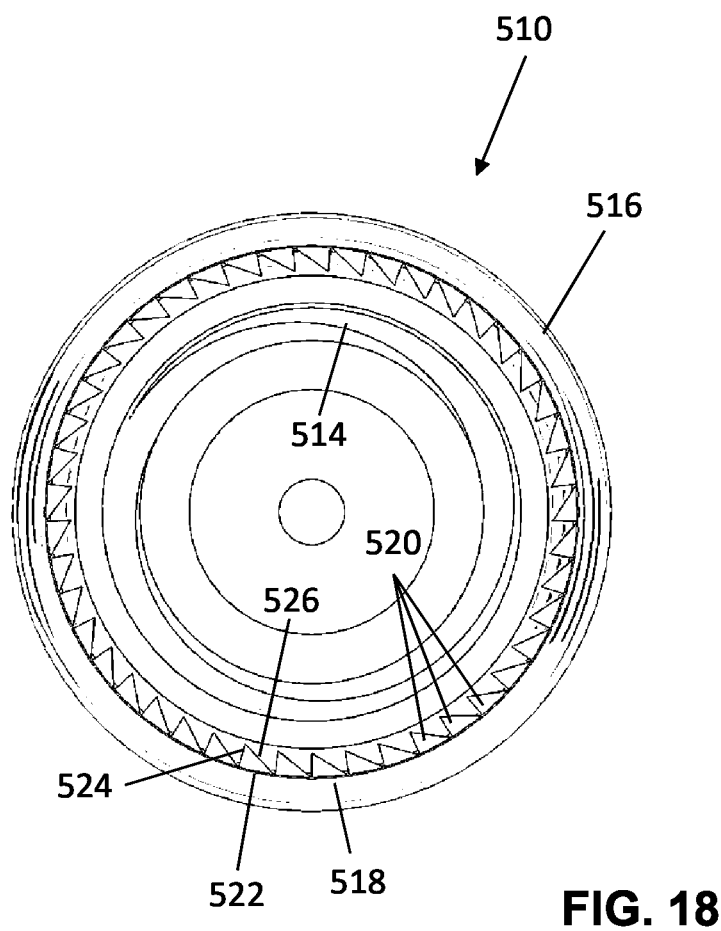
FIG. 18 is a proximal end view of the female ferrule of FIG. 17.
Figure 19:
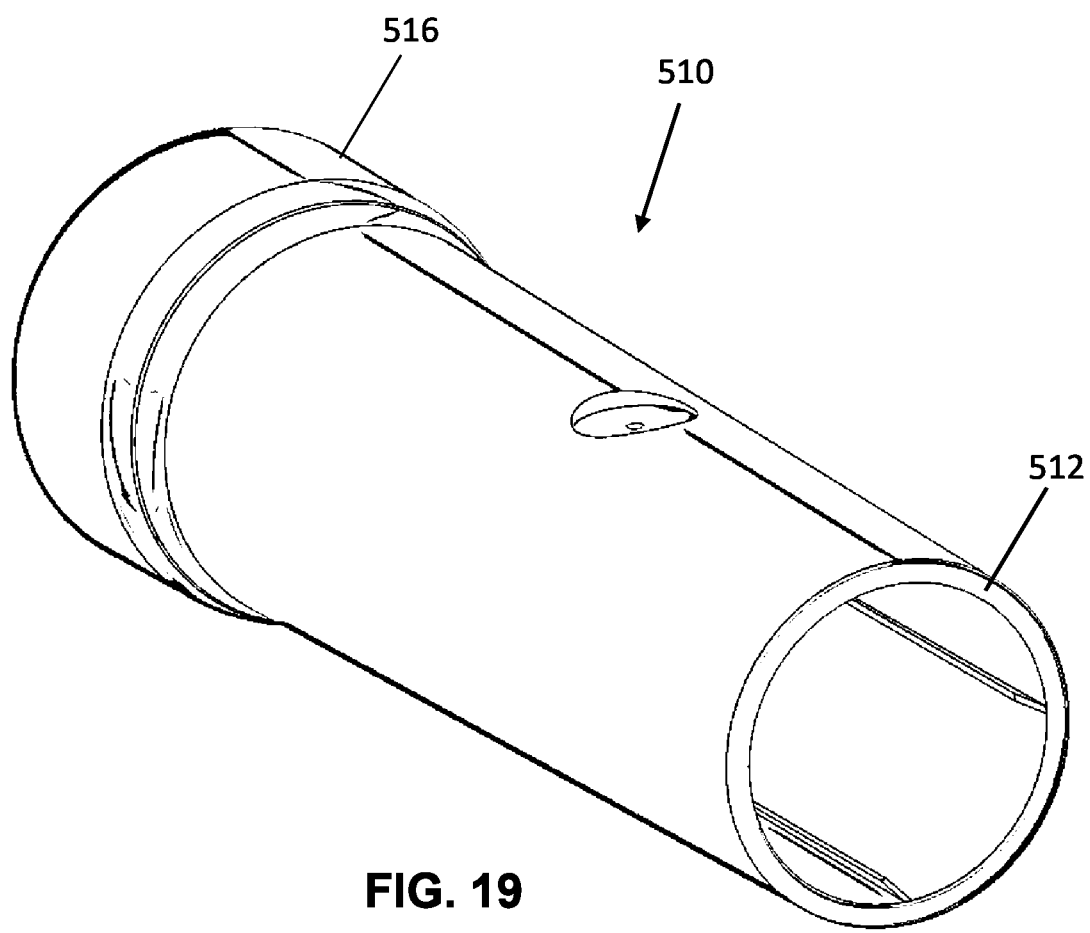
FIG. 19 is a perspective view of a female ferrule of FIGS. 17-18 from the distal end.

The ratcheting mechanism functions in such a way that as the distal end the male ferrule 530 defined by the threaded portion 534 is inserted into the proximal portion 516 the female ferrule, the chuck 548 at the distal end of the lever enters the proximal portion 516 and the arc of outward extending teeth 540 on the chuck 548 make contact with the inward extending teeth 520 within the female ferrule 510. Both the teeth 520 and the teeth 540 have longitudinally sloped terminal end surfaces to ease and guide their mutual engagement upon their encounter during insertion. The proximal ends of the teeth 520 have sloped surfaces 528 (FIG. 17). The distal ends of the teeth 540 have sloped surfaces 564 (FIG. 16).

During insertion, the sloped end surfaces 528 (FIG. 17) on the teeth 520 on the female ferrule 510 can make contact with the sloped end surfaces 564 (FIG. 16) on the teeth 540 of the lever 538 carried by the male ferrule 530 and push distal end of the lever 538 inward towards the axis 502, reducing the functional diameter of the male ferrule. The spring 554 underneath the lever 538 persistently pushes the distal end of the lever 538 outward, ensuring the two slopes maintain contact throughout this process, until the end of the slopes are reached, at which point the lever returns to its default locking position having a biased larger functional diameter. When this happens the vertical sides of the teeth on the lever (locking sides 544) makes contact with the vertical sides of the teeth on the female ferrule (locking sides 524), which prevents relative rotation between the male ferrule 530 and the female ferrule 510 in the opposite, counterclockwise direction. As a result, rotation is allowed only in the thread engaging clockwise direction, in spite of force/torque being applied in the disengaging, counterclockwise direction.

Because the teeth 540 mounted on the male ferrule 530 are biased to engage the teeth 520 of the proximal portion 516 of the female ferrule 516, the teeth 520 and the teeth 540 automatically engage as the threaded portion 534 on the male ferrule 530 is inserted into the proximal portion 516 the female ferrule 510. The teeth 520 within the female ferrule 510 include a large quantity of individual teeth 520, and define a ring of teeth 520 encircling the longitudinal axis 502. Thus, engagement with the teeth 540 of lever 538 can occur at many relative angles of rotation between the male ferrule 530 and the female ferrule 510. This allows better engagement control between the male ferrule and female ferrule because the outward thread on the male ferrule can have more or less engagement with the inward thread on the female ferrule. The user can therefore have better control over how tight the connection between the male ferrule and female ferrule must be, according to the specific use and preference of the user.

Further, the lever has a width such that it accommodates a plurality of teeth 540. This plurality of teeth allow for engagement between the vertical sides of all the teeth 540 on the lever 544 and the vertical sides of an equal number of teeth 520 on the female ferrule 524 to occur at the same time. This multiplies the actual contact surface that prevents movement between the male ferrule and the female ferrule. Because this surface is relatively large, the force/torque that the system can support to prevent relative rotation between and the male ferrule and the female ferrule is much larger. This increases the functionality and practicality of the system.

In order to separate the two ferrules, the lever 538 must be depressed. Applying force onto the flat space of the lever 538 temporarily reduces the functional diameter of the male ferrule 530, which allows the vertical side of the teeth 544 on the lever 538 to not make contact with the vertical side 524 of the teeth on the female ferrule 510, which allows for relative rotation in the counter-clockwise direction between the male ferrule 530 and female ferrule 510. This allows for the outward thread on the male ferrule 530 to disengage from the inward thread on the female ferrule 510, thereby allowing the male ferrule to separate from the female ferrule.

The pivoting lever 538, the spring 554, the pivot support mount 556 on the exterior of the male ferrule 530, the pin 552, the teeth 540, and the teeth 520 together define a ratcheting unidirectional anti-twist mechanism that automatically locks to maintain the threaded engagement of a male ferrule and female ferrule. The toothed chuck 548 on the spring loaded lever 538 carried by the male ferrule 530 is persistently biased into ratcheting engagement with female ferrule 510, permitting only tightening rotation of the female ferrule 510 relative to the male ferrule 530 around the axis 502 until user action on the lever 538 disengages the chuck from the female ferrule. The illustrated embodiment of the system includes right-handed threads on the male ferrule 530 and within the female ferrule 510 for intuitive use by typical users. During tightening rotation of the ferrules to engage their threads, the sloped hypotenuse faces 546 (FIG. 16) on the teeth of the lever 538 slide along the sloped hypotenuse faces 526 (FIG. 18) as the lever 538 is thereby pivoted from its default locking position. However, engagement of the locking sides 524 and 544 prevent opposite rotation until a user presses the lever 538 to disengage the chuck from the female ferrule.

FIG. 20 illustrates the male ferrule 530 and female ferrule 510 engaged. For the purpose of representing at least one use thereof, the male ferrule 530 is mounted on a first implement referenced as a first pole 570 by insertion of an end portion of the pole into the proximal end 532. Similarly, the female ferrule 510 is mounted on a second implement referenced as a second pole 572 by insertion of an end portion of the pole into the distal portion 512. The entire assembly thus defines a reach extension system arranged along the longitudinal axis 502. Many uses may come to mind in view of these descriptions and the referenced drawings, for example as represented in FIG. 10, for which extending the reach of a user or a tool can be served by the system 500. The poles 570 and 572 are illustrated in dashed line in FIG. 20 to represent each may be of any length preferred, and each may represent a mounting portion of a tool or accessory.

The poles may be made from a composite and/or fiberglass materials, and/or glass-reinforced polymer, as non-limiting examples. The ferrules 510 and 530 in some embodiments are constructed generally of electrically non-conductive materials, thus together defining an electrically non-conducting connection when joined. For example, whether or not each pole or other accessory on which either or both ferrules 510 and 530 are mounted are electrically conducting, each ferrule 510 and 530 independently provides an insulating (electrically non conducting) stage in any assembly of which either ferrule is a part. The spring 554 and pin 552 may be constructed of metal, such as steel, without ambiguity as to whether the male ferrule 530 is non-conducting. The spring and pin float electrically isolated within the male ferrule 530 without providing any current path from the proximal end 532 to distal end defined by the threaded portion 534. Non-conductive composite ferrules 510 and 530 enhance dielectric strength from top to bottom of a reach extension system, improving user safety while for example performing tree trimming and line clearance around overhead utility lines.

In the illustrated embodiment of the ferrule system 500 (FIG. 20), the male ferrule 530 carries the lever 538 (FIG. 14), with the outward teeth 540, biased (spring loaded) outwardly, and by pressing the lever a user reduces the diameter so the teeth disengage from the female ferrule 510, which has a whole ring of inward teeth 520 (FIG. 17). In another embodiment, a male ferrule has a whole ring of outward teeth, and a lever mounted on the female is biased inwardly to be activated to increase the diameter and disengage from the male. The reason for doing this is to allow for overlap between the male and female ferrules. Such an arrangement allows for greater overlap, which is seen for example in FIG. 3 and users seem to value.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A ferrule system comprising:
   a first ferrule comprising a proximal end for engaging a first implement and a threaded portion opposite the proximal end;
   a second ferrule comprising a distal portion for engaging a second implement, a proximal portion opposite the distal portion and comprising teeth, a threaded portion intermediate the distal portion and proximal portion and configured to engage the threaded portion of the first ferrule; and
   teeth mounted on a lever pivotably attached to the first ferrule and biased to automatically engage the teeth of the proximal portion of the second ferrule as the threaded portion of the first ferrule engages the threaded portion of the second ferrule such that only tightening rotation of the second ferrule relative to the first ferrule is permitted when the teeth mounted on the first ferrule are automatically engaged with the teeth of the proximal portion of the second ferrule.

2. The ferrule system of claim 1, wherein the teeth mounted on the first ferrule are connected to the lever, and the lever is biased by a bias force to automatically pivot to a default locking position at which the teeth mounted on the first ferrule automatically engage the teeth of the proximal portion of the second ferrule.

3. The ferrule system of claim 2, wherein the lever is user operable by being moved against the bias force, thereby pivoting the lever out of the default locking position, and disengaging the teeth mounted on the first ferrule from the teeth of the proximal portion of the second ferrule.

4. The ferrule system of claim 3, wherein:
   the proximal portion of the second ferrule comprises an interior wall;
   the teeth of the proximal portion of the second ferrule extend inward from the interior wall; and
   the teeth mounted on the first ferrule are connected to a distal end of the lever and extend outward.

5. The ferrule system of claim 4, wherein the distal end of the lever is inserted into the proximal portion of the second ferrule.

6. The ferrule system of claim 4, wherein:
the teeth mounted on the first ferrule comprise respective distal ends having sloped surfaces; and
the teeth of the proximal portion of the second ferrule comprise respective proximal ends each having a sloped surface.

7. The ferrule system of claim 6, wherein, when the threaded portion of the first ferrule is inserted into the proximal portion of the second ferrule, the sloped surfaces of the teeth of the proximal portion of the second ferrule make contact with the sloped surfaces of the teeth mounted on the first ferrule thereby pushing the distal end of the lever inward to ease mutual engagement of the teeth.

8. The ferrule system of claim 4, wherein the teeth of the proximal portion of the second ferrule define a ring of teeth encircling a longitudinal axis defined by the second ferrule.

9. The ferrule system of claim 8, wherein the teeth of the proximal portion of the second ferrule each have a profile when taken along the longitudinal axis in the shape of a right triangle.

10. The ferrule system of claim 9, wherein the teeth of the proximal portion of the second ferrule each comprise:
a base connected to the interior wall;
a locking side oriented perpendicular to the base and extending towards the longitudinal axis; and
a hypotenuse face that forms a slope.

11. The ferrule system of claim 10, wherein the teeth mounted on the first ferrule each comprise:
a base connected to the lever;
a locking side oriented perpendicular to the base and extending outward; and
a hypotenuse face that forms a slope.

12. The ferrule system of claim 11, during tightening rotation of the second ferrule relative to the first ferrule the hypotenuse faces of the teeth mounted on the first ferrule slide along the hypotenuse faces of the teeth of the proximal portion of the second ferrule causing the lever to pivot from its default locking position.

13. The ferrule system of claim 8, wherein the teeth mounted on the first ferrule are connected to a distal end of the lever along an arc of curvature that matches the ring of teeth within the second ferrule for intimate mutual engagement.

14. The ferrule system of claim 1, wherein:
the proximal end of the first ferrule comprises a first tube; and
the distal portion of the second ferrule comprises a second tube.

15. The ferrule system of claim 14, further comprising the first implement and the second implement, wherein:
the first implement comprises a first pole, a pruner and a rope, a double pulley pruner and a rope, a saw head, a saw blade, a hook saw blade and belting scabbard, and/or a limb and wire raiser, wherein this list is not exhaustive; and
the second implement comprises a second pole, a pruner and a rope, a double pulley pruner and a rope, a saw head, a saw blade, a hook saw blade and belting scabbard, and/or a limb and wire raiser.

16. The ferrule system of claim 4, wherein the teeth connected to the distal end of the lever extend outward to engage an equal number of teeth of the proximal portion of the second ferrule.

17. The ferrule system of claim 3, wherein a distal end of the lever comprises a tab trapped in a slot defined by the first ferrule thereby movably coupling the distal end of the lever to the first ferrule and preventing the lever from swinging therefrom.

* * * * *